INVENTORS
Karl August Thommel
Harald Brumme

Dec. 4, 1962 K. A. THOMMEL ET AL 3,066,921
APPARATUS FOR INTENSE AERATION OF LIQUIDS
Filed Oct. 12, 1959 4 Sheets-Sheet 2

INVENTORS
Karl August Thommel
Harald Brumme

By Bailey, Stephens + Huettig
ATTORNEYS

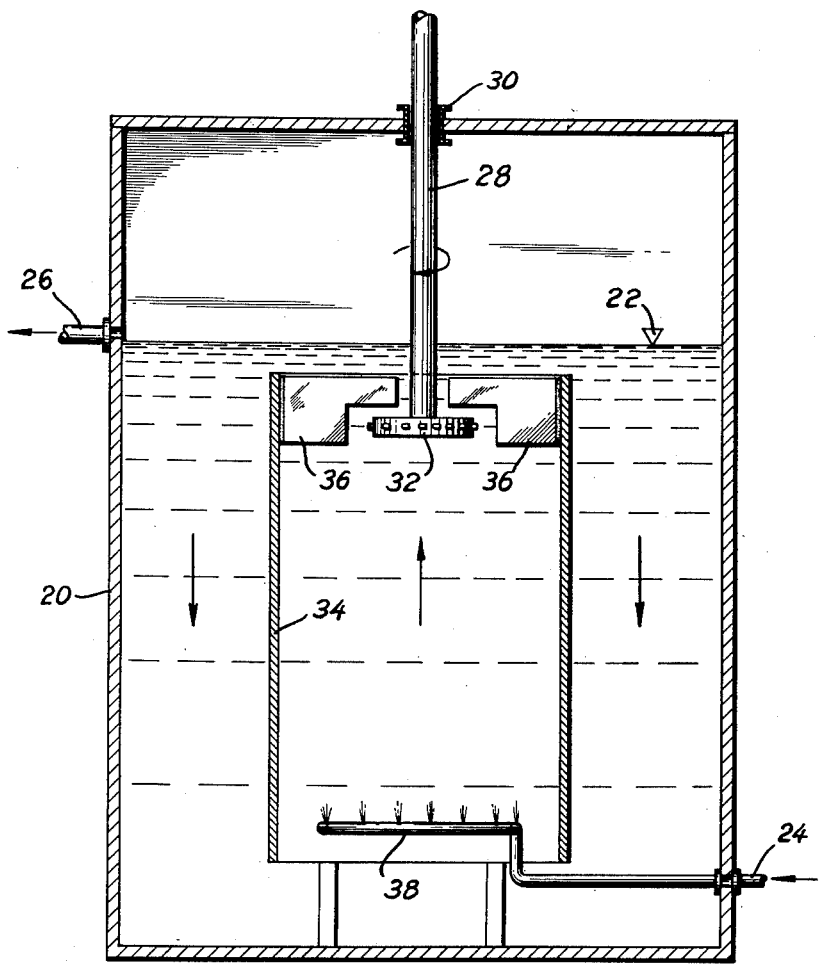

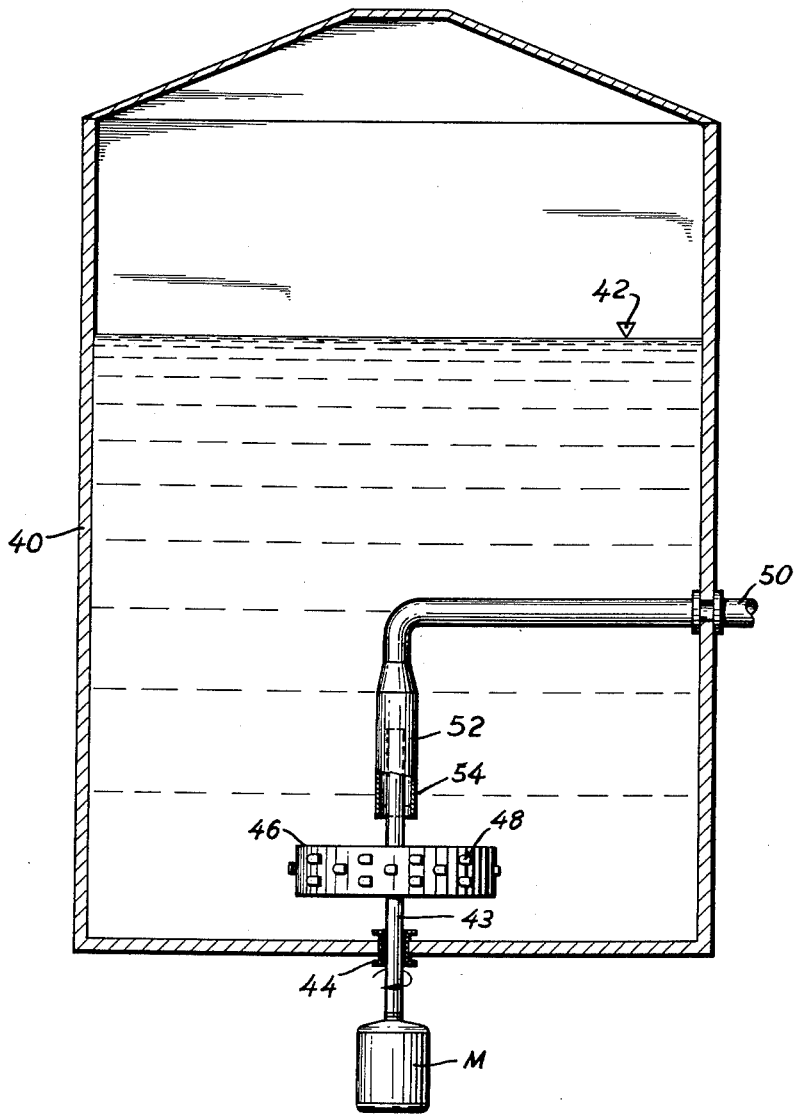

United States Patent Office 3,066,921
Patented Dec. 4, 1962

3,066,921
APPARATUS FOR INTENSE AERATION
OF LIQUIDS
Karl August Thommel, Ravensburg, and Harald Brumme,
Weingarten, Germany, assignors to Escher Wyss
G.m.b.H., Ravensburg, Wurttemberg, Germany
Filed Oct. 12, 1959, Ser. No. 845,739
9 Claims. (Cl. 261—30)

This invention relates to an apparatus for the intense aeration of liquids. In particular, the invention is directed to an apparatus in which intense aeration is used in order to expedite the activity of micro-organisms in producing aerobic biological transformations.

Conventional aeration is produced within a liquid in a container by means of stationary air jets or by means of a whirling disc connected to a hollow shaft with the air passing through outlet openings in the periphery of the disc. Such discs have the disadvantage in that ordinarily the total cross-sectional area of the outlets in the periphery of the disc is greater than the cross-sectional area of the air supply line. This means that, whenever the speed of the disc is slowed, there is danger in that the liquid will back-flow into the supply line.

The objects of this invention are to produce an apparatus in which the introduction of air into a liquid is improved in such a way that back-flow of the liquid is avoided, the quantity of air needed for treatment of the liquid is reduced, and the speed of the reaction is increased.

In general, these objects are obtained by joining a hollow disc to a hollow air supply shaft and providing openings in the periphery of the disc, with the total area of the openings being less than the inner cross-sectional area of the hollow shaft. Furthermore, the leading edge of each opening is shielded by a spoiler composed of a sheet of metal extended outwardly from the periphery of the disc and from which extends a cover which passes over the outlet opening and beyond the trailing edge of the opening.

The spoiler or shield, plus the cover, constitutes a vortex forming structure by means of which a vacuum is produced at each outlet opening as the disc revolves in a liquid. Such vacuum causes the air entering the liquid in the form of bubbles to be expedited and thus distributes the air more efficiently in the liquid. The shield extending outwardly of the periphery of the disc forms a steep front surface which initiates cavitation. The open space between the cover and the outlet opening constitutes the vortex area in which the air bubbles are formed and discharged into and whirled through the liquid with great intensity.

Each shield has a semicircular shape with a diameter about twice as large as that of the outlet opening, and the outward extent of the shield from the periphery of the disc is approximately the diameter of the outlet opening. The cover extends at right angles to the shield, and the trailing edge of the cover is parallel to the axis of the hollow shaft. This structure produces a vortex chamber in which the air, oxygen, or any other gas passing through the outlet opening is fully disseminated in the liquid. Consequently, a forced draft of the air and gas through the hollow shaft by means of a compressor or fan is unnecessary.

The hollow shaft is preferably driven by a variable speed device by means of which the rotation of the disc can be varied. This makes it possible to vary the peripheral speed of the aerating disc in order to proportion the quantity of air aspirated into the liquid in accordance with the height of the liquid within the container. Alternately, the disc can remain constant and the liquid level varied in the container. With a given disc at a constant speed of rotation, the quantity of air aspirated from the disc into the liquid is a reciprocal of the depth of the liquid in the container. That is to say, a greater quantity of air is aspirated by the disc at a low liquid level than at a high liquid level in the container.

Ordinarily, in aerating containers, it is not desirable to rotate a liquid in the container during aeration, and this is prevented by means of baffles. These are composed of one or more metal sheets mounted in the container from adjacent the bottom to near the liquid level, and the baffles are ordinarily attached to the wall of the container. Such baffles, due to their size, often have a disturbing effect upon the liquid in the container. Again, the effectiveness of the aeration is diminished as the zones behind the large surface areas of the baffles in the direction of the rotation of the disc are subject to little aeration; while in front of the baffles, the small air bubbles are blocked and combined to form large air bubbles so that the air is not uniformly dispersed throughout the liquid. According to this invention, the baffles are so located as to not have the above disadvantages but rather produce a more uniform aeration of the liquid in the container. A further advantage lies in that the baffles do not form weakly aerated zones even in rectangular containers. Consequently, this invention enables the use of a rotary disc in achieving a uniform aeration of a liquid in a rectangular container, whereas such was heretofore possible only in a cylindrical container.

The baffles of this invention are composed of four individual metal sheets diagonally disposed in a rectangular or square container. These baffles extend from the bottom of the container to only slightly above the aerating disc and have upper portions extended to closely adjacent the hollow air supply shaft. The maximum length of each baffle is about one-fourth of the diameter of a cylindrical container and about one-fourth of the diagonal of a rectangular container. In a preferred form, each baffle has a downwardly inclined outer edge and is cut away in order to extend over the aerating disc. In addition to being fastened to the bottom of the container, the baffles can be stiffened by cross bracing.

In the fermentation of micro-organisms, the nutritive liquid is either fed intermittently or continuously into the aerating container. Likewise, in the aerobic purification of waste liquid or drain water, the raw liquid, as well as a part of the sludge which is deposited in the final purification basin, is pumped into the aerating container. This raw liquid is usually introduced into the top of the container so that it is mixed for some period of time with the total liquid in the container. It has been discovered, according to this invention, that the biochemical reaction is expedited when the raw liquid is fed in a finely distributed form directly adjacent the aerating disc so that the nutritive substances in the liquid are immediately enriched with oxygen while being intensely whirled by the disc. The raw liquid introducing means consists of a pipe ring mounted above the disc by being connected to the baffles and through which the raw liquid is fed. Liquid discharge openings are formed uniformly over the bottom side of the annular pipe, and the diameter of the pipe at the outlet area is slightly greater than the diameter of the disc taken at the covers mounted over the outlet openings in the periphery of the disc. Thus the raw liquid coming from the pipe ring is discharged in the vortex areas in which the most intense aeration exists.

According to the various combined features of this invention, intensification is obtained in the aerobic breeding of micro-organisms, as well as the biochemical synthesis and transformations taking place in such organisms, so that the quantity of air needed is substantially less than in heretofore known devices. For example, it has been found that, under otherwise equal conditions and with the same yield, the quantity of air required by this invention in the production of bakers' yeast is only about 25% of that needed for a stationary pipe jet aeration and 45% of that of a conventional rotary aeration apparatus. In the production of 100 kg. bakers' yeast, having a 27% dry substance content from 100 kg. molasses with 50% sugar, the following comparative quantities of air are required:

|  | Cb. m. air |
|---|---|
| Jet pipe aeration | 1100 |
| Conventional rotary aerating disc | 620 |
| This invention | 280 |

The means by which the objects of the invention are obtained are described more fully with reference to the accompanying drawings, in which:

FIGURE 5 is a view similar to FIGURE 1 of a modified form of the invention; and

FIGURE 6 is a view similar to FIGURE 1 of a further modified form of the invention.

Figure 1:
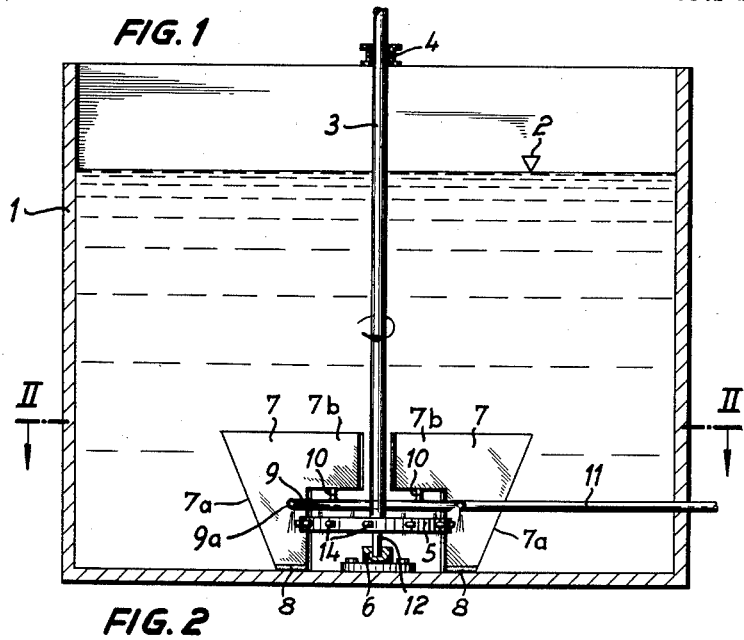
FIGURE 1 is a vertical cross-sectional view through the aerating container of this invention.
Figure 2:
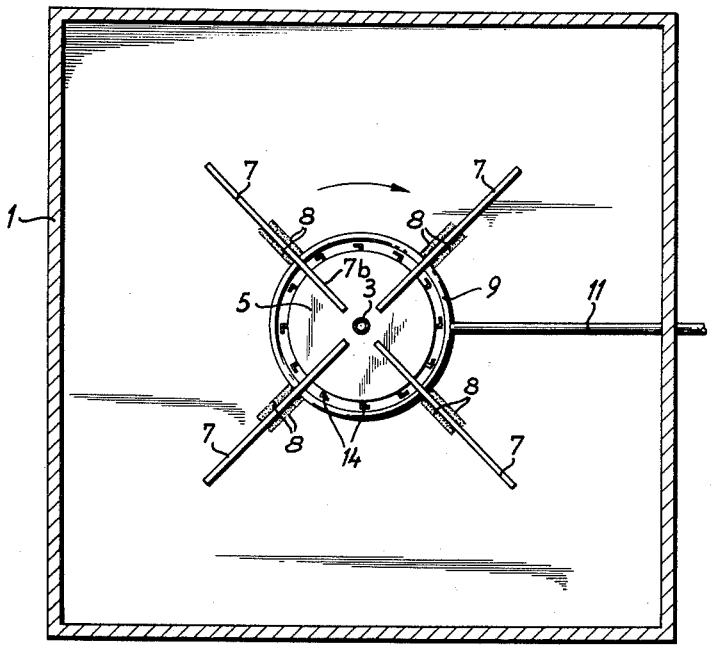
FIGURE 2 is a cross-sectional view on the line II—II of FIGURE 1.
Figure 3:
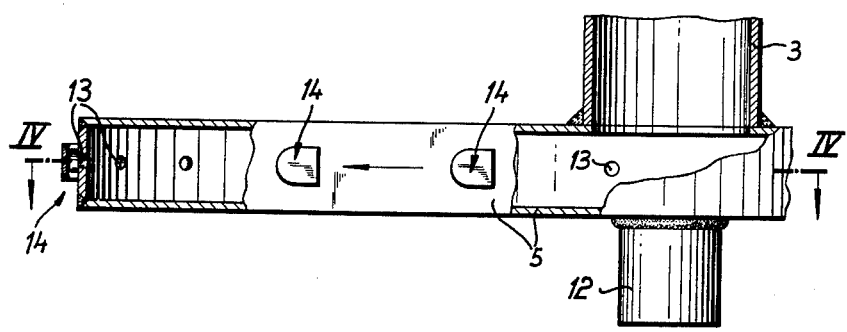
FIGURE 3 is an enlarged detail view, partly in section, of the aerating disc of FIGURE 1.
Figure 4:
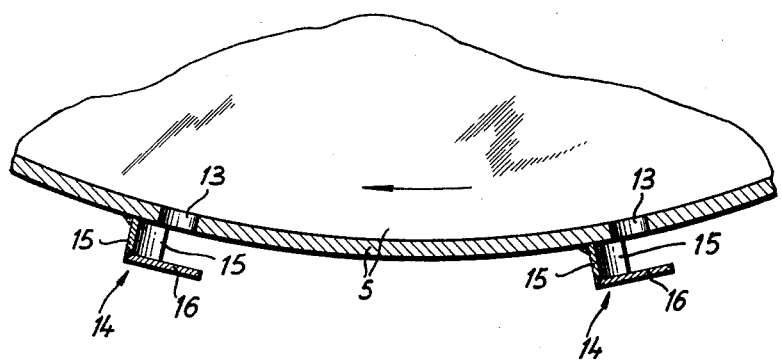
FIGURE 4 is a partial cross-sectional view on the line IV—IV of FIGURE 3.

As shown in FIGURE 1, the container 1 is filled with liquid to the liquid level 2. The vertical hollow air supply shaft 3 is turned from its upper end by bearing 4 in order to rotate a horizontal hollow disc 5 secured to the lower end of the shaft which is supported in bearing block 6. Sheet metal baffles 7 extend diagonally of the container and are secured to the bottom of the container by wells 8. Each baffle has a downwardly and inwardly inclined outer edge 7a and has an upper portion 7b extending above disc 5 to closely adjacent shaft 3. The raw liquid is discharged into container 1 by means of a ring pipe 9 which has downwardly directed outlet openings 9a above disc 5, and which is connected by means of fittings 10 to baffles 7 in order to cross brace and stiffen the baffles. Raw liquid is fed to the annular pipe 9 through intake pipe 11.

The lower side of disc 5 is supported in bearing block 6 by means of the post 12.

Extending uniformly around the periphery of disc 5 are a plurality of outlet openings 13. The sum total of the area of these openings is less than the cross-sectional area of shaft 3. A vortex area or chamber adjacent each opening 13 is formed as follows. Extending radially outward from and perpendicular to the periphery of disc 5 and in advance of the leading edge of each opening 13 is a shield or spoiler 15 which is semi-circular to form a C shape having a diameter approximately twice the diameter of opening 13. The extent of shield 15 outwardly from the periphery of disc 5 is about equal the diameter of opening 13. The trailing edge 15a of shield 15 extends to less than half the diameter of opening 13. A cover 16 is secured to the outer end of shield 15 and extends beyond the trailing edge of opening 13, the disc 5 being rotated in the direction of the arrow as shown. Inasmuch as a large portion of the side wall space between cover 16 and opening 13 is open, a cortex is formed by means of which the air passing through opening 13 is intensely aspirated and mixed with the liquid in the container.

In FIGURE 5, the container 20 holds liquid up to the liquid level 22, with the liquid being continuously supplied to the container through intake pipe 24 and discharged through pipe 26. Hollow air supply shaft 28 is journalled in bearing 30 in the top of container 20 and is driven from above the container. At the bottom of shaft 28 is the hollow disc 32 similar to the disc 5 of FIGURE 1, but which is positioned in the upper portion of the container near the surface level 22. A stationary cylinder 34 surrounds disc 32, and baffles 36 are secured to the inner wall of cylinder 34 in substantially the same manner as the baffles 7 of FIGURE 1. Raw liquid introduced into container 20 passes through intake pipe 24 through pipe ring 38 located in the lower portion of cylinder 34 adjacent the bottom of container 20 and provided with upwardly directed liquid outlet openings.

As disc 32 is rotated, air is aspirated into the liquid. The aerated liquid has a lower specific gravity than the raw liquid, and therefore the mixture of air and liquid rises from the plane of disc 32 and flows out of the top of cylinder 34. This aerated liquid is continuously replaced by the raw liquid rising from pipe ring 38, and the aerated liquid flowing out of the top of cylinder 34 flows downwardly in the space between cylinder 34 and container 20 so that a liquid circulation takes place which moves downwardly outside of cylinder 34 and upwardly within cylinder 34. This upward movement is supplemented by the raw liquid being supplied through pipe ring 38. Treated liquid is removed from pipe 26 at the same rate as raw liquid is supplied through intake pipe 24.

In FIGURE 6, the container 40 is closed at the top and bottom and contains liquid filled to the level 42, the quantity of liquid in the cylinder being constant. Hollow shaft 43 is journalled in a bearing 44 in the bottom of the shaft and driven by a motor M. Mounted on this shaft adjacent the bottom of container 40 is a hollow disc 46 which contains a plurality of rows of outlet openings in the periphery thereof. Each outlet opening is a vortex forming device 48 exactly similar to the construction shown in FIGURES 1 to 4. However, the vortexes in adjacent rows are staggered with respect to each other.

Shaft 43 extends upwardly above disc 46. Air intake pipe 50 has an enlarged end portion 52 which is loosely telescoped over the upper end of shaft 43 so as to leave a space between the shaft and pipe end portion 52. Compressed air is passed through pipe 50 to disc 46. The air pressure is such that the liquid between shaft 43 and pipe end portion 52 is depressed down to a level 54, thus forming a hydrostatic pressure seal between shaft 43 and pipe end portion 52.

The operation of the invention is further illustrated by the following examples, in each of which the hollow shaft supplying the air to the apparatus has a diameter of 60 mm. equal to a cross-sectional area of 2,826 mm.$^2$.

*Example 1*

100 kg. of molasses having a sugar content of 50% and containing the conventional nutritive salts was prepared for a yeast fermentation and placed in a cylindrical container of 1400 mm. in diameter and 1900 mm. in height. This container was provided with the aeration disc and baffles as shown in FIGURE 1. To promote fermentation, 25 kg. of starting yeast was added to the molasses, together with water, so that the container was filled with 2300 liters. The aeration disc was 330 mm. in diameter and had in its periphery eighteen air outlets of 9 mm. diameter each, making a total opening area of 1,144.6 mm.$^2$. The disc was rotated for 13 hours in the fermentation process. At the end, 100 kg. of newly formed bakers' yeast having a 20% dry substance content was produced. The disc was rotated at a speed of 1200 r.p.m. and 280 cb. m. of air was required for the fermentation process.

*Example 2*

190 kg. of molasses having a 50% sugar content was used as in Example 1 and in the same container, together with 25 kg. of starting yeast. Water was added to produce 2300 liters of raw liquid, and the aeration by means of the disc was continued for 13 hours. However, an aeration disc having a diameter of 450 mm. was used in which the periphery of the disc contained twenty air outlets of 9 mm. diameter, equal to about 1,271.8 mm.$^2$. At the end of 13 hours, there was produced 100 kg. of bakers' yeast with a 27% dry substance content, plus from 16 to 18 liters of pure alcohol. The disc was rotated at a speed of 770 r.p.m. and used 240 cb. m. of air.

*Example 3*

In the same container as in Examples 1 and 2, the process was employed for the aerobic purification of the waste drain water from a bakers' yeast plant. Intermittently produced drain water was collected in a receptacle and, together with wort continuously supplied from the plant distillery, was continuously passed to the container. The flow rate of the raw liquid was such that the content of the container, amount to about 2.3 m.³ was renewed each 5 hours. The aeration disc had a diameter of 250 mm., in the periphery of which were fourteen air outlet openings of 9 mm. each, giving a total area of 890.3 mm.². The discharged purified liquid was passed through a sludge settling basin and then poured directly into a sewer.

In this process, the raw liquid required 5,940 mg. BSB5/l. (pH=5.2), this being the biochemical oxygen need in 5 days per liter of liquid. After being aerated for 5 hours, the raw liquid was decomposed to 1,350 mg. BSB5/l. (pH=7.4). This performance can be improved by adding inoculated sludge through organisms cultivated for the specific raw liquid being treated.

This last example demonstrates that highly polluted industrial waste waters can be subject to aerobic purification in an activated sludge process using the apparatus of this invention and producing the advantage that smaller containers can be used than heretofore with a shorter purification time due to the intense aeration and rapid decomposition of this invention. The high intensity of the oxygen supply makes it possible to directly decompose concentrated raw liquids without the need of diluting the same.

This is further demonstrated by the following table which compares the capacity of a conventional activated sludge apparatus with the apparatus of the instant invention:

|  | Conventional Plant | Plant of This Invention |
|---|---|---|
| Requirement of raw liquid in mg. BSB 5/l. (biochemical oxygen need in 5 days per liter) | 2,000 | 6,000 plus |
| Capacity of aeration container at 75% decomposition in kg. BSB 5/cb. m. container space_____kg | 6 | 20 |
| Aeration time for the raw liquid in the container_____hours | 10 | 5 |

This shows that the apparatus of this invention, as compared to the conventional plants, requires less space and has substantially less construction and operation expenses for the purification of waste liquids.

Having now described the means by which the objects of the invention are obtained.

We claim:

1. An apparatus for the intense aeration of aerobic micro-organisms in a liquid comprising a container, a vertical hollow air supply shaft mounted for rotation in said container, a horizontal hollow disc secured to said shaft, a plurality of air outlet openings in the periphery of said disc, the total combined cross-sectional area of which is less than the hollow cross-sectional area of said shaft, a C-shaped spoiler shield secured to the periphery of said disc in front of the leading edge of each opening and extending radially outward of said disc, said shield having a trailing edge extending to less than one half of the diameter of the opening, and a cover plate secured to the outer end of each shield and having a diameter substantially greater than the diameter of the opening to extend over and beyond the trailing edge of the opening.

2. An apparatus as in claim 1, each shield extending outwardly of said disc a distance equal approximately to the diameter of the opening.

3. An apparatus as in claim 2, further comprising a plurality of baffle plates secured to said container radially of said shaft and surrounding said disc.

4. An apparatus as in claim 3, further comprising an annular pipe having downwardly directed outlet openings mounted immediately above and concentric with said disc, said annular pipe being of slightly greater diameter than said disc, and means for introducing raw liquid into said container through said annular pipe.

5. An apparatus as in claim 1, said disc being mounted in the upper portion of said container, and further comprising a cylinder surrounding said disc, and means for introducing raw liquid into said container through the bottom of said cylinder.

6. An apparatus as in claim 1, said disc being mounted in the lower portion of said container with the upper end of said hollow shaft being below the liquid level in said container, and pipe means for introducing air into the upper end of said shaft at a pressure producing a hydrostatic seal between said shaft and the liquid in said container.

7. An apparatus as in claim 6, said pipe means comprising a pipe loosely telescoped over the upper end of said shaft.

8. An apparatus as in claim 7, further comprising a plurality of vertically spaced rows of air outlet openings in the periphery of said disc.

9. An apparatus as in claim 8, said outlet openings in adjacent rows being staggered with respect to each other.

References Cited in the file of this patent

UNITED STATES PATENTS

| 191,805 | Long et al. | June 12, 1877 |
| 859,427 | Brandenburg | July 9, 1907 |
| 1,268,630 | Ruth | June 4, 1918 |
| 1,365,278 | Ruth | Jan. 11, 1921 |
| 1,632,758 | Fulweiler et al. | June 14, 1927 |

FOREIGN PATENTS

| 188,676 | Austria | Feb. 11, 1957 |
| 200,519 | Austria | Apr. 15, 1958 |
| 218,637 | Switzerland | Dec. 31, 1941 |

OTHER REFERENCES

Germany, B 15,744 IV c/12e, Nov. 8, 1956.